(12) United States Patent
Patil

(10) Patent No.: US 8,932,673 B2
(45) Date of Patent: Jan. 13, 2015

(54) METHODS OF FABRICATING LARGE-AREA GRAPHENE

(75) Inventor: Vikram Patil, Hoboken, NJ (US)

(73) Assignee: Vikram Patil, Fort Collins, CO (US)

( * ) Notice: Subject to any disclaimer, the term of this patent is extended or adjusted under 35 U.S.C. 154(b) by 358 days.

(21) Appl. No.: 13/456,894

(22) Filed: Apr. 26, 2012

(65) Prior Publication Data

US 2013/0287956 A1 Oct. 31, 2013

(51) Int. Cl.
*C01B 31/04* (2006.01)
*C23C 16/00* (2006.01)
*B05D 3/10* (2006.01)

(52) U.S. Cl.
USPC .................. 427/249.1; 427/299; 423/448

(58) Field of Classification Search
USPC ................... 427/249.1, 299; 423/448
See application file for complete search history.

(56) References Cited

U.S. PATENT DOCUMENTS

| 8,043,687 | B2 * | 10/2011 | Kamins et al. | 428/172 |
| 2011/0206934 | A1 * | 8/2011 | Bol et al. | 428/408 |
| 2012/0258587 | A1 * | 10/2012 | Kub et al. | 438/610 |
| 2013/0001515 | A1 * | 1/2013 | Li et al. | 257/24 |

OTHER PUBLICATIONS

Li, et al., "Large-Area Synthesis of High-Quality and Uniform Graphene Films on Copper Foils," Science, vol. 324, pp. 1312-1314, 2009.
A. Ismach, et al., "Direct Chemical Vapor Deposition of Graphene on Dielectric Surfaces," Nano Letters, vol. 10, pp. 1542-1548, 2010.
I. Vlassiouk, et al., "Role of Hydrogen in Chemical Vapor Deposition Growth of Large Single-Crystal Graphene," ACS Nano, vol. 5, pp. 6069-6076, Jul. 26, 2011.
W. Zhang, et al., "First-Principles Thermodynamics of Graphene Growth on Cu Surfaces," The Journal of Physical Chemistry C, vol. 115, pp. 17782-17787, 2011.
L. Gao, et al., "Epitaxial Graphene on Cu(111)," Nano Letters, vol. 10, pp. 3512-3516, 2010.
C.Y. Su, et al., "Direct Formation of Wafer Scale Graphene Thin Layers on Insulating Substrates by Chemical Vapor Deposition," Nano Letters, vol. 11, pp. 3612-3616, 2011.
J. Gao, et al., "Graphene Nucleation on Transition Metal Surface: Structure Transformation and Role of the Metal Step Edge," Journal of the American Chemical Society, vol. 133, pp. 5009-5015, 2011.
A. Reina, et al., "Large Area, Few-Layer Graphene Films on Arbitrary Substrates by Chemical Vapor Deposition," Nano Letters, vol. 9, pp. 30-35, 2008.
H. Ago, et al., "Epitaxial Chemical Vapor Deposition Growth of Single-Layer Graphene over Cobalt Film Crystallized on Sapphire," ACS Nano, vol. 4, pp. 7407-7414, 2010.
P.Y. Teng, et al., "Remote Catalyzation for Direct Formation of Graphene Layers on Oxides," Nano Letters, vol. 12, pp. 1379-1384, 2012.

(Continued)

*Primary Examiner* — Cachet Sellman
(74) *Attorney, Agent, or Firm* — Cloudigy Law PLLC

(57) ABSTRACT

A method for fabricating large-area, high-quality Graphene product. Specifically, the fabrication method uses a seed layer of exfoliated Graphene in combination with a substrate and a catalyst metal layer and introduces Carbon atoms to the Graphene seed, causing growth of high-quality Graphene product. The method of the invention combines some steps of current mechanical exfoliation techniques with other steps of the CVD process and adds a new technique to the fabrication method involving seed-based catalyst of large-area Graphene product growth.

20 Claims, 14 Drawing Sheets

(56) References Cited

OTHER PUBLICATIONS

Z. Sun, et al., "Growth of graphene from solid carbon sources," Nature, vol. 468, pp. 549-552, 2010.

A.C. Ferrari, et al., "Raman Spectrum of Graphene and Graphene Layers," Physical Review Letters, vol. 97, pp. 187401-1-187401-4, 2006.

A.K. Geim and K.S. Novoselov, "The rise of Graphene," Nature Materials, vol. 6, pp. 183-191, 2007.

* cited by examiner

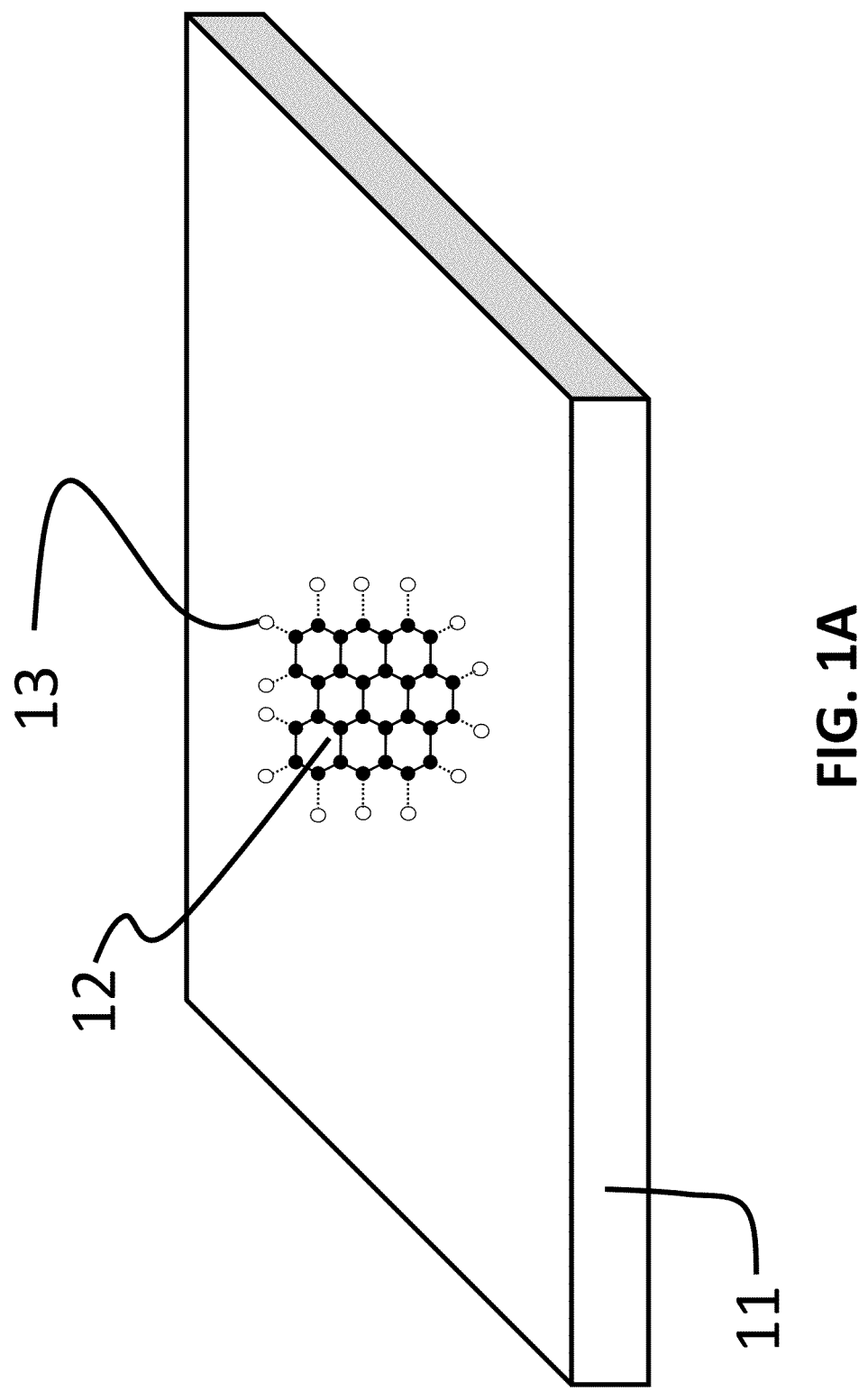

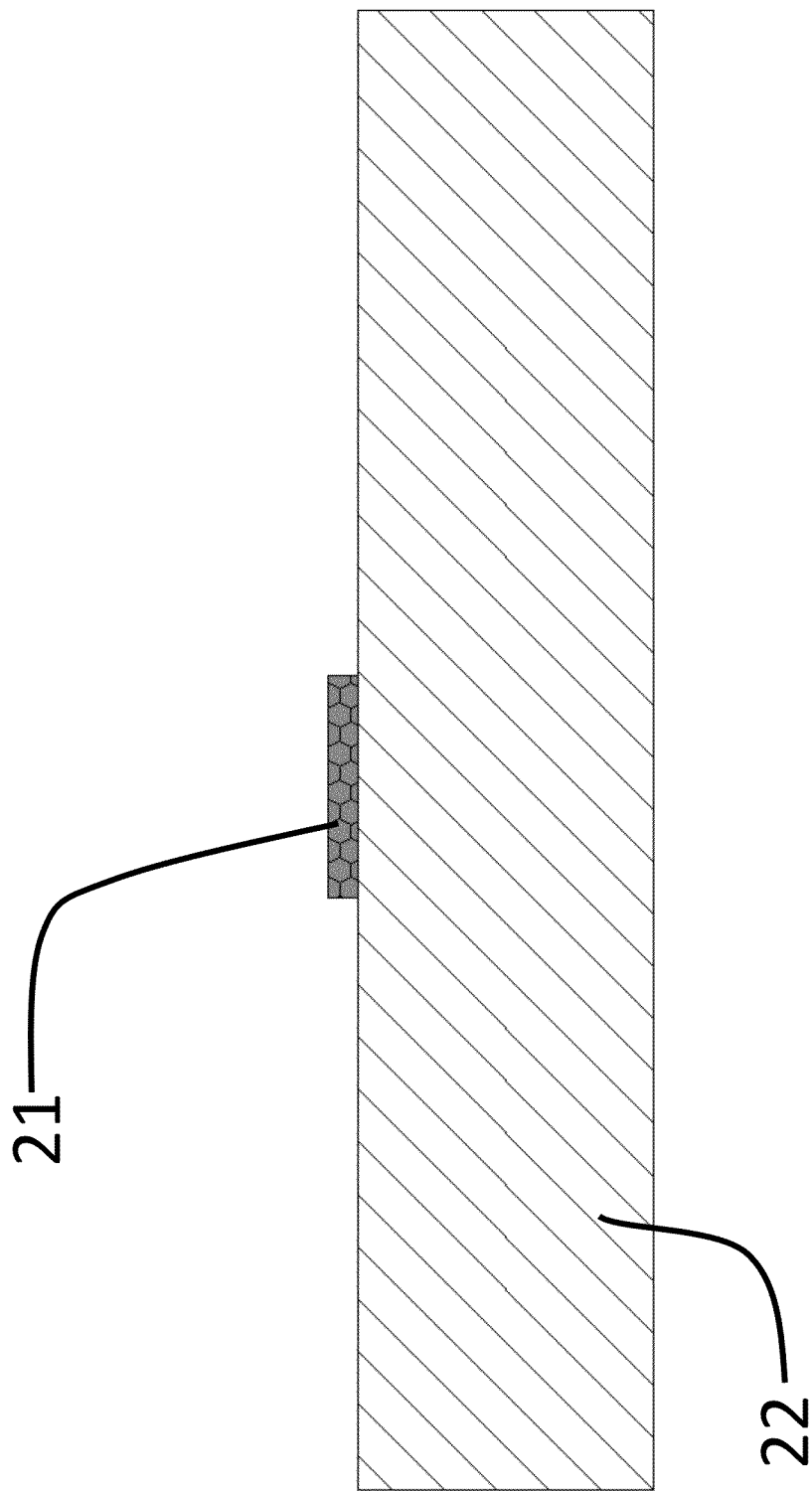

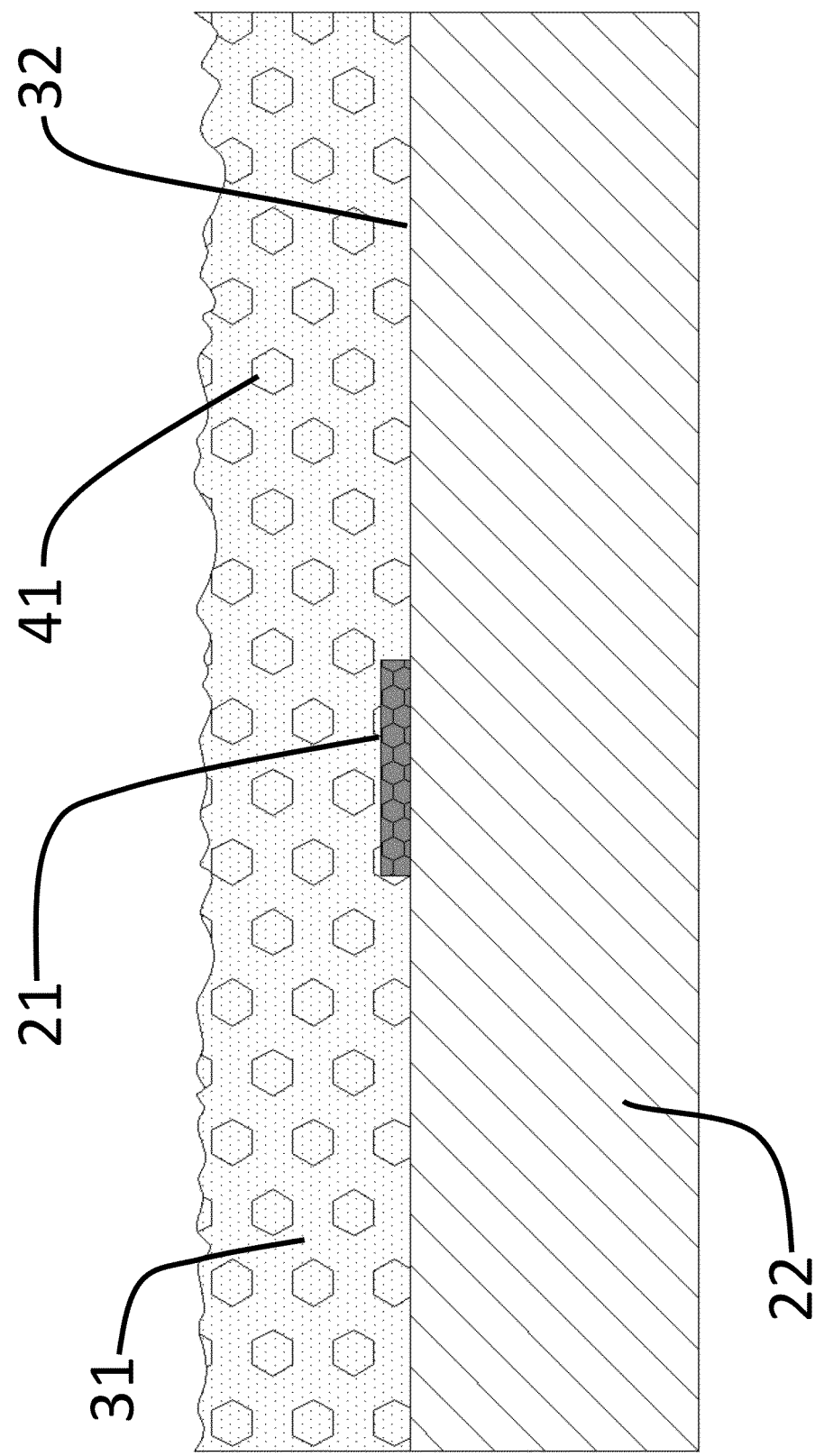

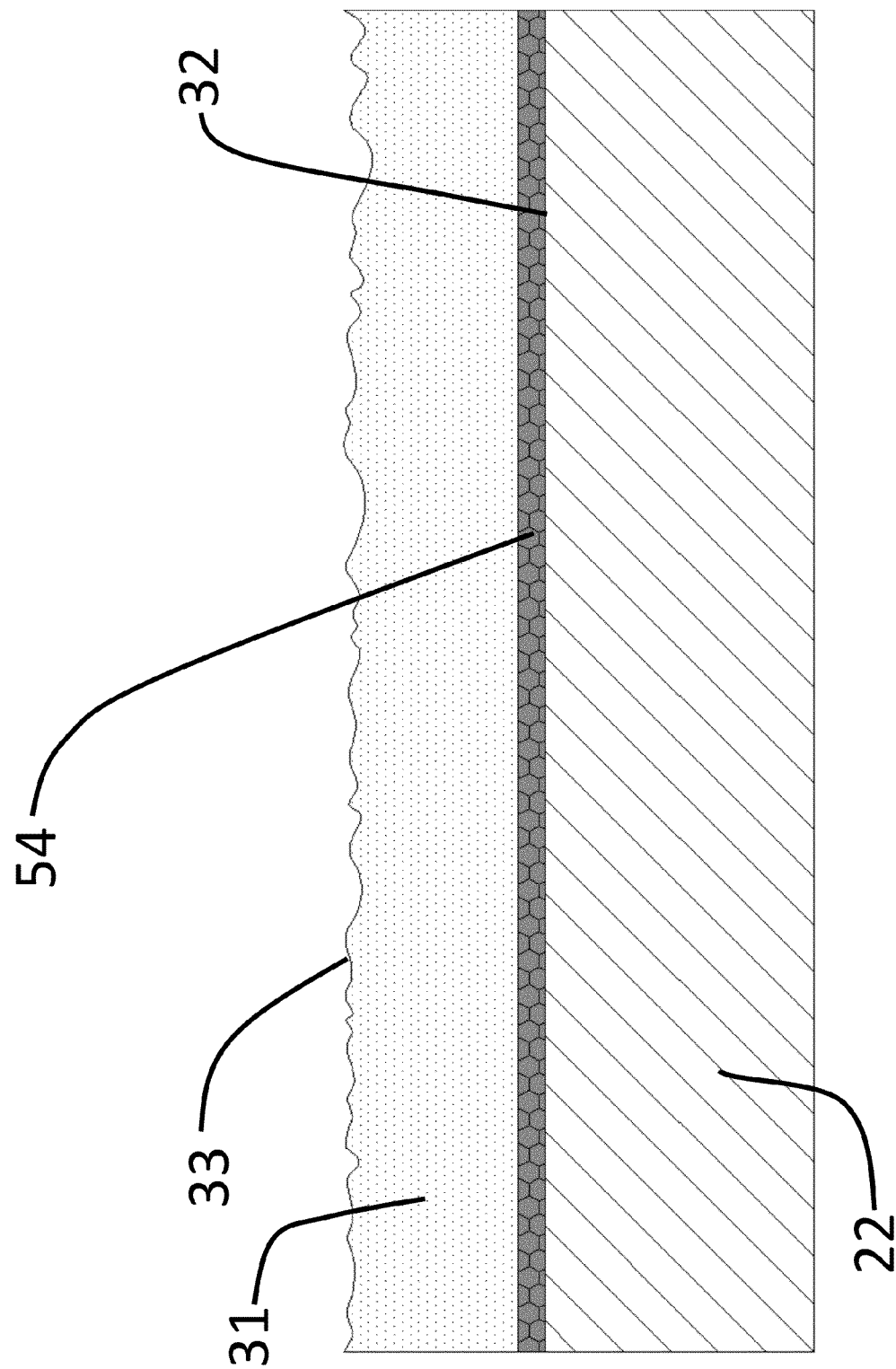

METHODS OF FABRICATING LARGE-AREA GRAPHENE

FIELD OF INVENTION

The present invention relates to methods of fabricating large-area, high-quality Graphene, and more particularly, fabrication using a seed layer of exfoliated Graphene.

BACKGROUND

Description of Related Art

Graphene is a newly discovered two-dimensional material that exhibits extraordinary electrical, mechanical, and optical properties. Graphene has become attractive in many application areas including nanoelectronics, nanophotonics, and novel sensor technology and is considered a promising alternative to silicon electronics. Graphene has been demonstrated to be a tough (including high tensile strength in both planes) and chemically stable material, and has very high electron mobility. This means that Graphene-based products have a wide range of potential industrial applications for silicon-wafer compatible production.

A high quality of Graphene product is essential to achieve these extraordinary properties. So far, only one known fabrication technique of mechanical exfoliation has produced such a high-quality Graphene product. This manual fabrication technique involves exfoliation or mechanical cleaving of Graphite surfaces multiple times until a single atom layer of Graphene is obtained using a sticky surface such as Scotch® tape. The details of this technique can be found in various published studies, including the study reported by A. K. Geim and K. S. Novoselov in "The rise of graphene," Nat. Mater., vol. 6, pp. 183-191, 2007. Graphene manufactured using this method displays a hexagonal pattern of Carbon atoms, in two dimensions. And due to its unique atomic structure and high quality, mechanically exfoliated Graphene exhibits all the extraordinary properties mentioned above.

However, this well-known method of mechanical exfoliation is limited in its industrial or commercial utility by very low and inconsistent yields of Graphene product, which makes it impossible to apply this method to high-volume Graphene device fabrication. Other large-area Graphene fabrication techniques involving chemical vapor deposition (CVD) have been used in industrial methods, but suffer from other shortcomings. Very large area Graphene fabrication methods involving CVD deposit Carbon atoms on a catalyst metal surface and result in the growth of Graphene at high temperatures. But large-area Graphene fabricated using the standard CVD process lacks the quality of the exfoliated Graphene obtained using the mechanical exfoliation method. For example, the electron mobility and optical transmission values of CVD-grown Graphene are generally much lower of than that of mechanically exfoliated Graphene. Also, the CVD-grown Graphene exhibits inconsistent quality over the large surface area, which causes inconsistent and unreliable physical, electrical, and optical properties. Hence, in spite of its large area, CVD-grown Graphene is a poor material for many potential applications such as ultrafast transistors and high-efficiency photodetectors.

This invention overcomes the quality, industrial yield, and commercial viability limitations of the current Graphene growing methods by providing a method for fabricating high-quality Graphene over a large area. The method of the invention combines some steps of current mechanical exfoliation techniques with other steps of the CVD process and adds a new technique to the fabrication method involving seed-based catalyst of large-area Graphene product growth.

SUMMARY

The present invention provides a method for depositing high-quality uniform Graphene over a large area and involves placement of a seed of high-quality Graphene on a desired substrate to begin the deposition process. Specifically, the present invention involves using a single or several layers of Graphene as a seed layer and depositing that seed layer onto a desired substrate using well-known mechanical exfoliation techniques. The substrate containing the seed layer of Graphene may then be introduced to Carbon atoms during the large-area Graphene fabrication process at high temperature, in the presence of one or more hydrocarbon gases, to catalyze the deposition of high-quality Graphene onto the substrate. During this fabrication process, the seed layer, when exposed to appropriate conditions and reagents, catalyzes the growth of Graphene of similar high quality and uniformity as the Graphene found in the seed layer. Using this process, the substrate may then be covered with large-area Graphene, which may grow to the edge of the substrate.

Certain embodiments of the present invention involve mechanical exfoliation of Graphite to deposit a seed layer of high-quality Graphene on a desired substrate. Embodiments of the present invention further include fabrication sequences for growth of Graphene over a large area using processes such as CVD. Optionally, embodiments of the present inventions involve growth of high-quality Graphene over large areas using a Graphene seed layer deposited on a silicon dioxide substrate.

Other features and advantages of the present invention will become apparent to those skilled in Graphene and silicon wafer fabrication techniques in light of the specification, including the associated drawings, and the claims.

BRIEF DESCRIPTION OF FIGURES

FIGS. 1A, 1B, and 1C illustrate high-quality Graphene growth using a seed layer deposited onto the substrate.

FIG. 2 illustrates a cross-sectional view of the substrate with a seed layer of mechanically exfoliated high-quality Graphene.

FIG. 4 illustrates a cross-sectional view of the substrate and the catalyst metal layer showing the intermediate step of Carbon atom absorption into the catalyst metal layer and diffusion through the catalyst metal layer boundaries during a CVD process.

FIG. 6 illustrates a cross-sectional view of the substrate with newly formed large-area, high-quality Graphene underneath the catalyst metal layer and a clean top surface of the catalyst metal layer after etching of the top layer of Graphene occurs.

DETAILED DESCRIPTION

In the following description, several details relating to the fabrication method of the invention are set forth, including particular materials, processing steps, processing sequences, dimensions, and fabrication techniques. However, it will be appreciated by one with ordinary skill in the art that the invention may be practiced using a wide range of materials and protocol variations deemed acceptable in current Graphene and silicon wafer fabrication processes that are not inconsistent with this invention.

Figure 1B:
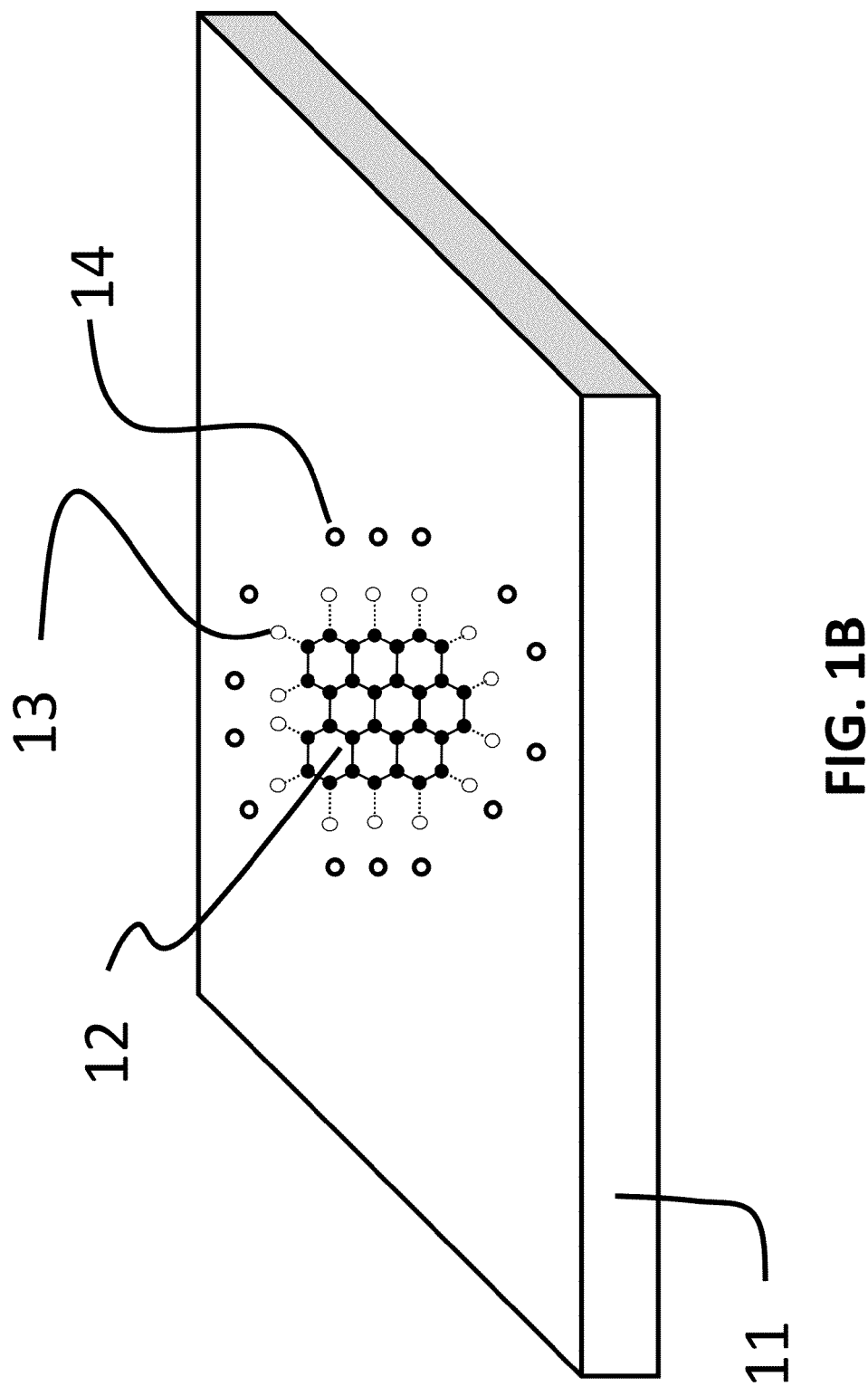
Figure 1C:
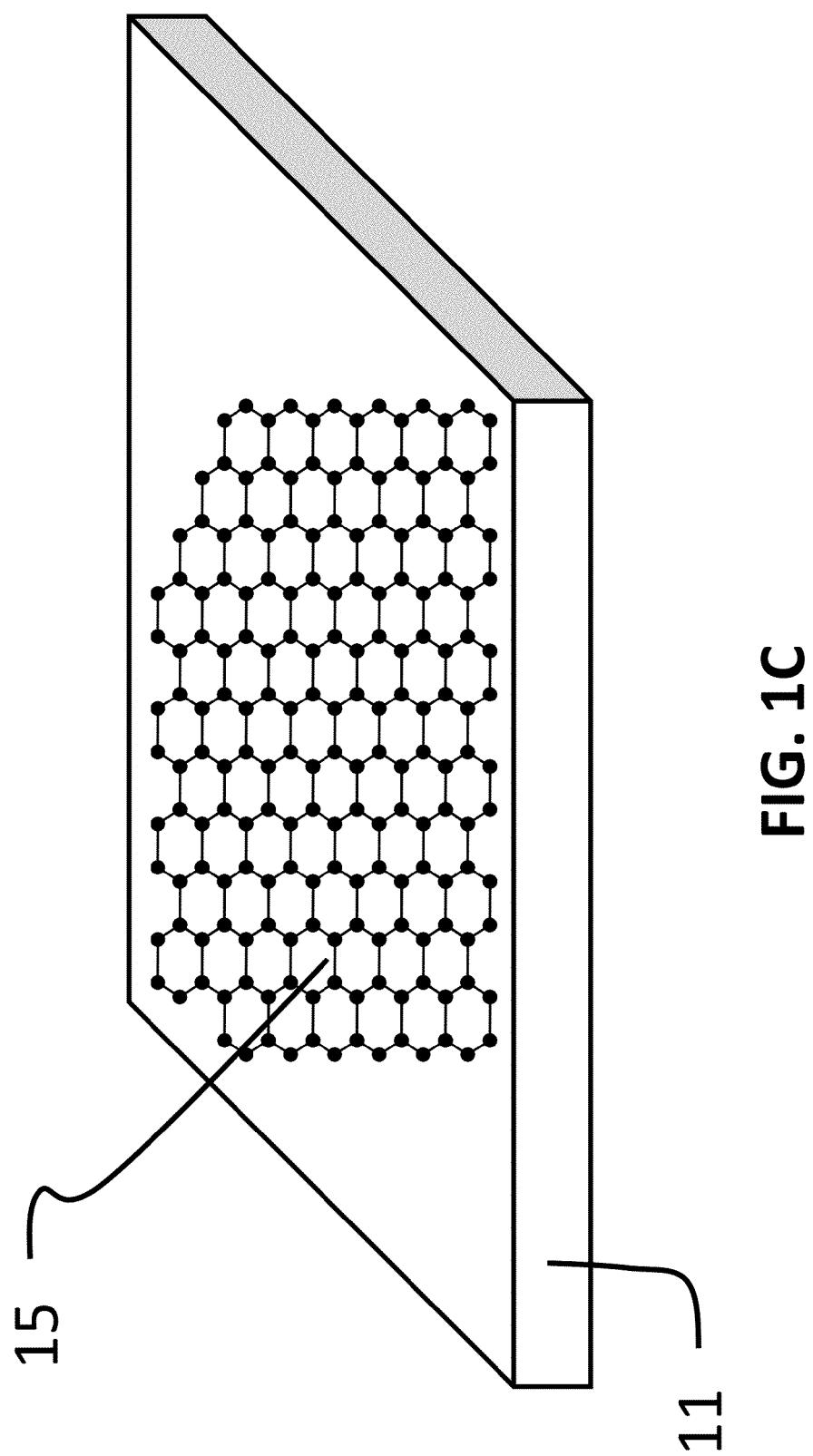

The general concept of the present invention is illustrated in FIGS. 1A through 1C. The present invention may use single or several layers of high-quality Graphene as a seed layer 12, which is deposited onto a desired substrate 11. The edges of exfoliated Graphene contain incompletely bonded atoms 13, which are high-energy atomic sites. When the substrate 11 with the Graphene seed layer 12 is processed to fabricate Graphene over a large area on the substrate, the incompletely bonded atoms 13 serve as nucleation sites for Carbon atoms 14 introduced during the fabrication process. Some of these Carbon atoms 14 may crystallize around the seed layer 12 during the process, leading to Graphene growth from the seed layer 12. Should significant crystallization of the Carbon atoms 14 occur, this can produce large-area, high-quality Graphene 15 growth on the substrate 11.

In one embodiment of the present invention illustrated in FIG. 2, a Graphene seed layer 21 is deposited onto a substrate 22 using a mechanical exfoliation technique. The substrate 22 may be a 300 nm thick silicon dioxide ($SiO_2$) layer, as an example. The seed layer 21 may consist of single, or optionally, several layers of high-quality Graphene. The base substrate 22 may comprise suitable materials that can withstand the subsequent high-temperature processes without affecting the Graphene's growth or properties and that have the desired properties for this specific application. For example, silicon dioxide ($SiO_2$), silicon carbide (SiC), silicon nitride ($Si_3N_4$), quartz, silicon, sapphire, ST-cut quartz, or other materials known in the field may be suitable substrate materials for Graphene fabrication.

Figure 3:
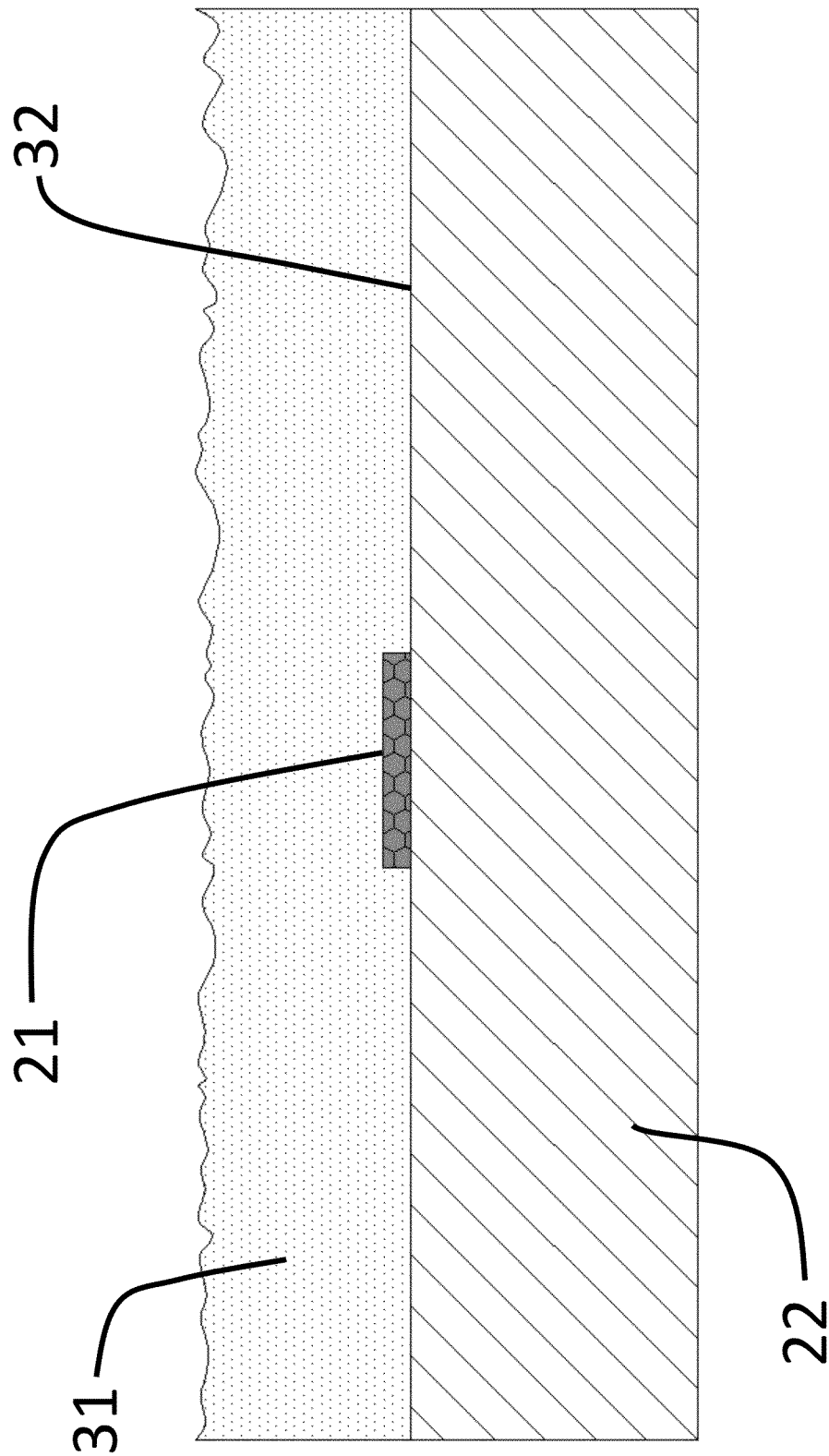
FIG. 3 illustrates a cross-sectional view of the catalyst metal layer deposited onto the substrate with the seed layer.

In FIG. 3, a catalyst metal layer 31 is deposited onto the substrate 22, which already contains a Graphene seed layer 21. The catalyst metal layer 31 may comprise any suitable catalyst metal for Graphene growth using the CVD process including: Copper (including a patterned Copper), Nickel, Cobalt, Rhodium, Ruthenium, and Platinum. Graphene grown on Nickel may be limited by its small grain size, multilayers at the grain boundaries, and the high solubility of Carbon. Thus, Nickel and other catalyst metals with similar properties can be useful for fabrication processes that are intended to produce smaller and self-limiting Graphene products.

The thickness of the catalyst metal layer 31 may be between approximately 100 nm-800 nm, or any other suitable thickness that promotes growth of Graphene on the bottom surface 32 of the catalyst metal layer 31, which intersects with the substrate 22 in certain embodiments. In published studies, 300 nm Copper layers have exhibited strong bottom layer Graphene growth, but the optimal catalyst metal layer thickness for a particular fabrication protocol will vary depending on the specific processing conditions. A lower thickness may lead to increased dewettting and increased thickness may impede Graphene formation at the catalyst metal layer-substrate interface because the increased length of the diffusion path from the top surface to the interface can lead to Carbon atom deficiency, which can in turn halt seed growth. The Graphene formation mechanism likely differs for Graphene grown on Nickel and other catalyst metals.

The deposition process for the catalyst metal layer 31 may involve the E-beam evaporation technique, with suitable process parameters that deposit a uniform layer of the catalyst for the catalyst metal layer 31 onto the substrate 22. For example, the catalyst metal layer 31 may be a 100 nm Copper metal film that is deposited using the E-beam evaporation process.

With reference to FIG. 4, the stack of substrate 22 with seed layer 21 and a catalyst metal layer 31 may be processed using the CVD process to introduce Carbon atoms 41 into the catalyst metal layer 31. The CVD process may be carried out using known processing conditions, temperatures, and gases suitable for the growth of Graphene on the bottom surface 32 of the catalyst metal layer 31. The Carbon atom source may comprise gases that are flowed over the catalyst metal layer, including: methane, ethane, ethylene, or other hydrocarbon gas.

Graphene growth temperatures may range from above 850° C. to approximately 1000° C. Lower growth temperatures tend to interfere with the growth of a continuous bottom Graphene layer on the substrate surface. And though the precise mechanism by which temperatures above 1000° C. impede high-quality Graphene growth requires further study, it is believed that higher temperatures can lead to increased formation of defects due to the energetic growth of Graphene from the seed and a potentially higher rate of Carbon atom diffusion to the catalyst metal layer-substrate interface that overtakes the rate of graphitization. This information, however, demonstrates a method of the invention involving growth of self-limiting Graphene product.

By way of example, during the CVD process Hydrogen, Argon, and a Carbon source gas such as methane flows over the catalyst metal layer 31 at a temperature of 900° C. for 5 minutes, followed by a rapid cooling step involving a temperature drop of 10° C./s. At the high temperature of 900° C., methane gas decomposes and the Carbon atoms 41 are dropped from the gas state and absorbed into the catalyst metal layer 31. These Carbon atoms 41 diffuse through the catalyst metal layer 31 grain boundaries to the catalyst metal layer-substrate interface, where the Graphene seed layer 21 is located. These Carbon atoms 41 in turn feed the growth of Graphene product by activation of the nucleation sites around the seed layer 21. At temperatures higher than 900° C., care should be taken to avoid dewetting or evaporation of the catalyst metal layer 31 during the CVD process.

A solid carbon source—such as a polymer poly-methyl methacrylate (PMMA)—can also be used as a source of Carbon atoms for CVD processes. Z. Sun et al., "Growth of grapheme from sold carbon sources," Nature, vol. 468, pp. 549-552, 2010. The polymer may be spin coated onto the catalyst metal layer 31 under high-temperature conditions (over approximately 850° C.). Then the substrate-catalyst metal layer complex is added to the furnace to begin the CVD process. As with CVD involving a hydrocarbon gas source, the polymeric layer decomposes and releases Carbon atoms 41, which diffuse through the catalyst metal layer 31 grain boundaries to the Graphene seed layer 21.

Figure 5A:
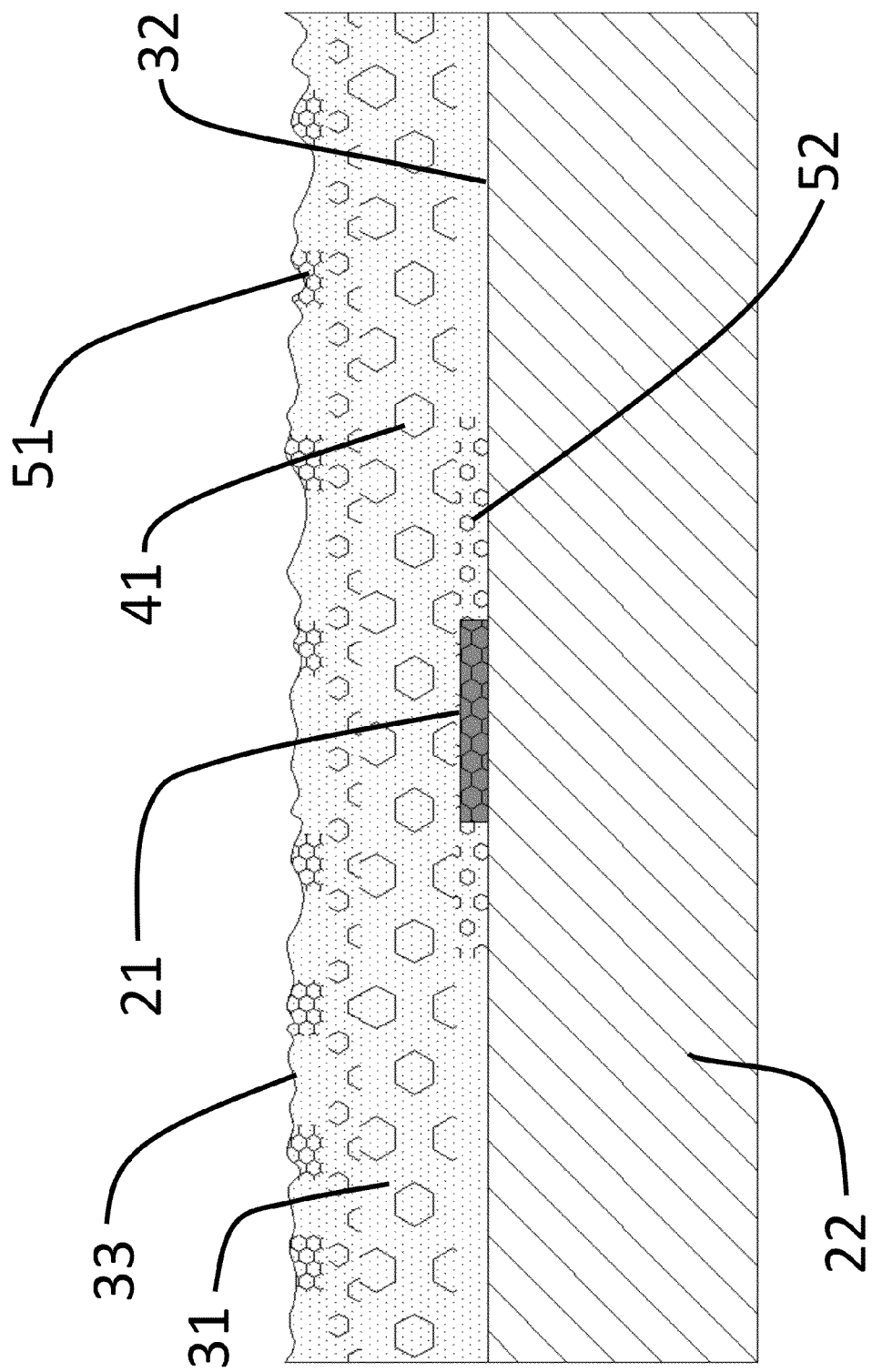
FIG. 5A illustrates a cross-sectional view of the substrate and the catalyst metal layer showing formation of nucleation sites around the seed layer underneath the catalyst metal layer and at random high-energy locations on top of the catalyst metal layer.
Figure 5B:
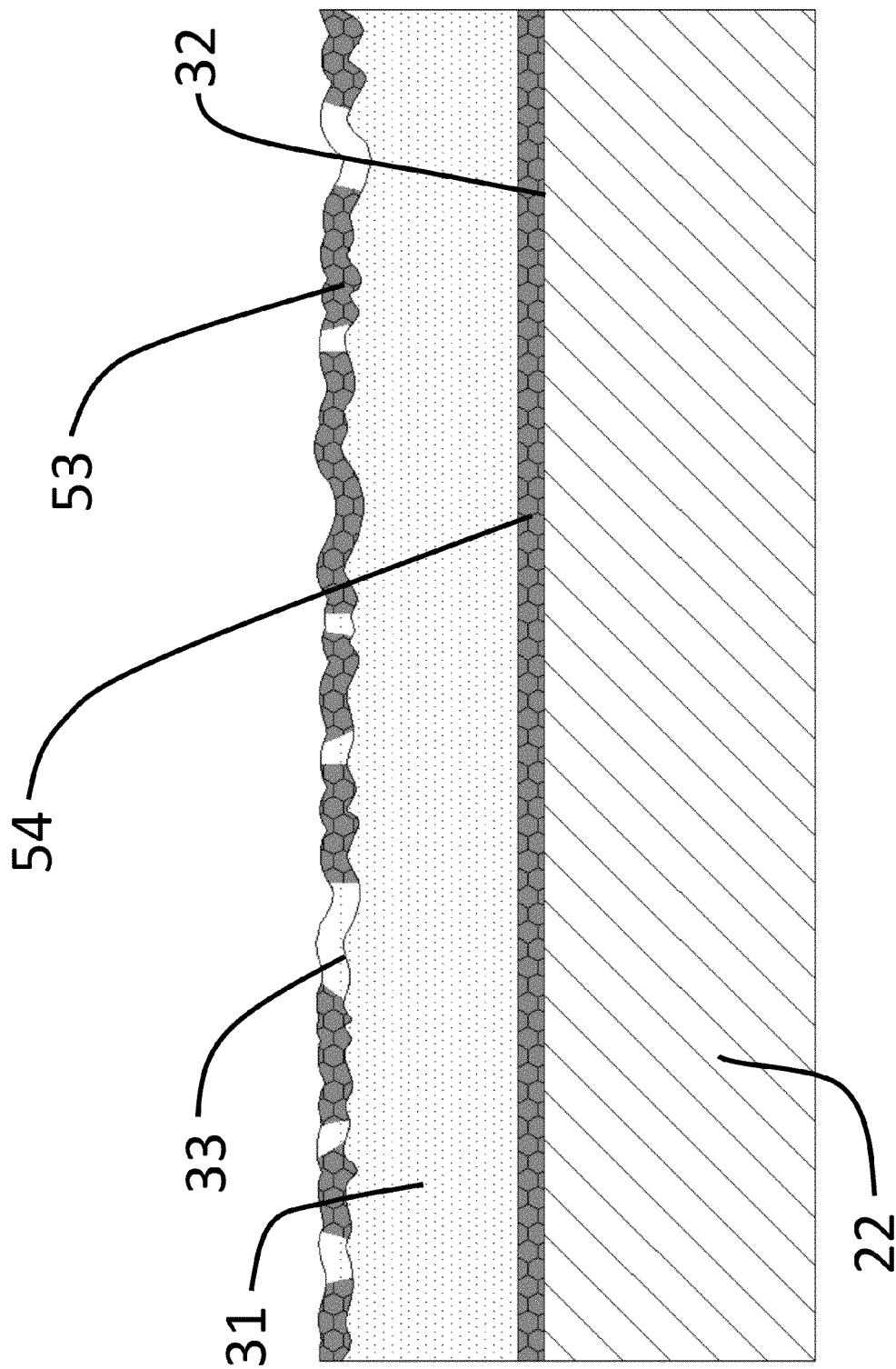
FIG. 5B illustrates a cross-sectional view of the substrate and the catalyst metal layer with crystallized layers of Graphene appearing around the nucleation sites.

During the subsequent rapid cooling step illustrated in FIG. 5A and FIG. 5B, the Carbon atoms 41 may be precipitated onto the top surface 33 and diffuse through to the bottom surface 32 of the catalyst metal layer 31. On the top surface 33, nucleation sites 51 may be formed at random locations, resulting in a Graphene top layer 53 that may exhibit grain boundaries and would be considered lower-quality Graphene. In contrast, on the bottom surface 32, the seed layer 21 provides a template high-quality Graphene structure that guides nucleation 52 and further movement of precipitated Carbon atoms 41 into the large-area, high-quality Graphene 54 structure on the bottom surface 32. The quality and uniformity of this large-area Graphene 54 is expected to be similar to that of the seed layer 21.

After the cooling step, the Graphene top layer 53 (on the top surface 33 of the catalyst metal layer 31) may be removed using well-known techniques such as Reactive Ion Etching (RIE) as illustrated in FIG. 6. In fact, the Graphene top layer 53 and the Copper layer may both be removed to expose the large-area, high-quality Graphene 54 using one or more techniques including RIE, wet chemical etching, and oxygen plasma treatment. The catalyst metal layer 31 may also be removed using one or more suitable metal etchants. For example, a catalyst metal layer 31 of Copper may be removed using Copper etchant solution such as aqueous iron chloride solution ($Fe(NO_3)_3$). The substrate 22 is then exposed with a high-quality Graphene 54 product.

Figure 7:
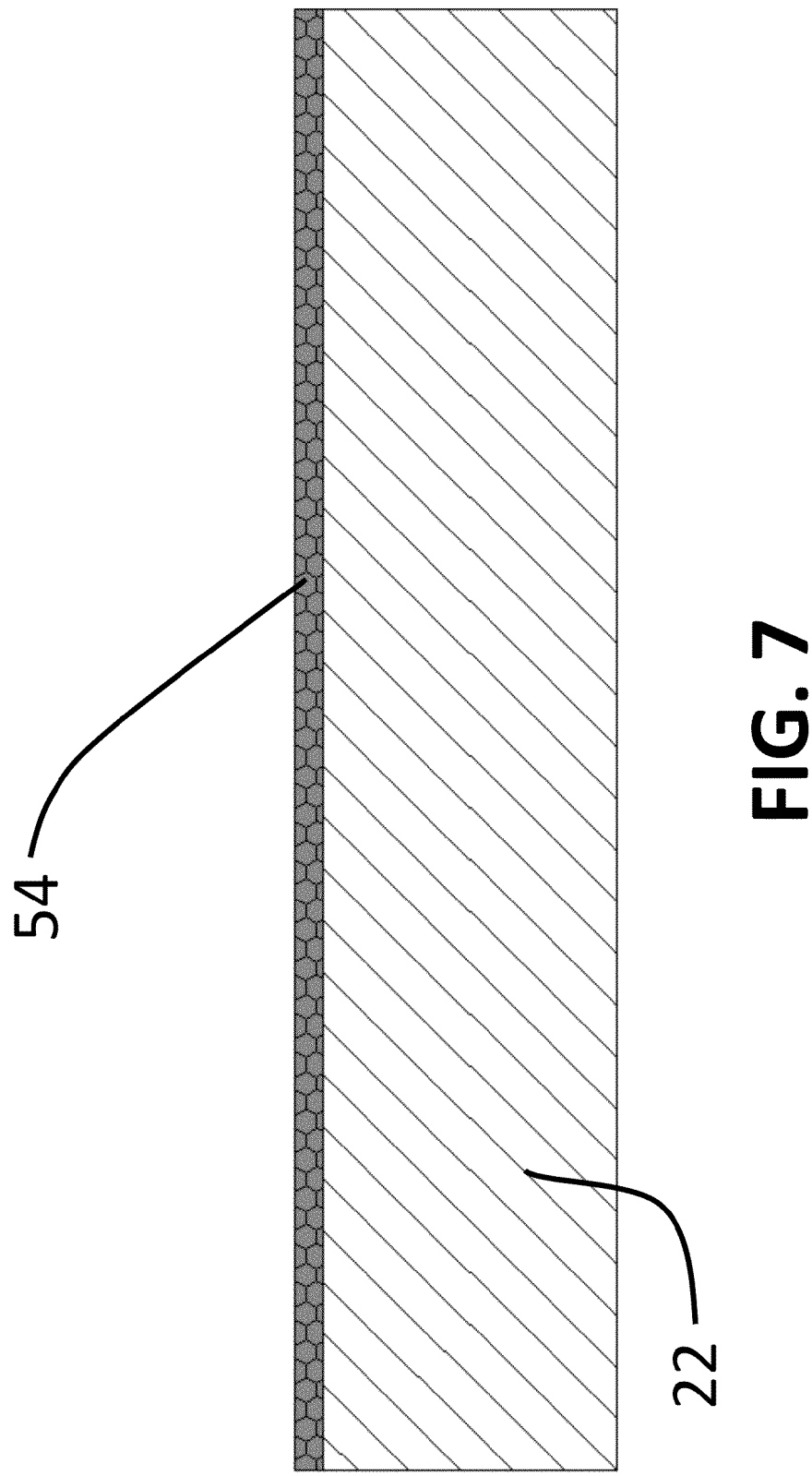
FIG. 7 illustrates a cross-sectional view of the substrate with large-area Graphene after etching away the catalyst metal layer.

The bottom layer Graphene 54 interferes with the adhesion between the catalyst metal layer 31 and the substrate 22. Thus, optionally, the catalyst metal layer 31 can be mechanically peeled off to expose the bottom layer Graphene 54, using adhesive tape, as shown in FIG. 7. After the catalyst metal layer 31 is removed, another substrate may be contacted with the bottom layer Graphene 54 to pull it from the solution or the surface of the Graphene-substrate complex may be coated with polydimethylsiloxane or poly-methyl methacrylate, and after the Copper is dissolved the adhesive-Graphene complex may be pulled from the solution. Additionally, aqueous potassium hydroxide or well known Buffer oxide etch (BOE) processes may also be used to remove the Graphene product from the substrate 22, such as silicon dioxide. The etching time will be a function of the etchant concentration, the area, and the thickness of the catalyst metal layer 31.

After fabrication is complete, the bottom layer Graphene 54 can be transferred to alternative substrates, including $SiO_2$/Si or glass for investigation of its quality, continuity, thickness, or its utility for other applications. Raman spectra provide structural characterization data for the resulting bottom layer Graphene 54.

High-quality Graphene products that are fabricated using the methods of this invention may display electrical, mechanical and optical properties comparable to mechanically exfoliated Graphene. For example, high-quality Graphene products are expected to demonstrate field effect mobility from approximately 4000 $cm^2$/Vs up to and possibly greater than 15000 $cm^2$/Vs, optical transmission greater than 90%, and Raman spectra with so-called G and 2D bands at approximately 1580 $cm^{-1}$ and 2700 $cm^{-1}$ respectively. For some Graphene products, a minor D band may also be present at the Graphene product sample edges, however, it is the G and 2D bands that are primarily used to quantify disorder, layering, and determine the quality of the Graphene product.

Example 1

Figure 8A:
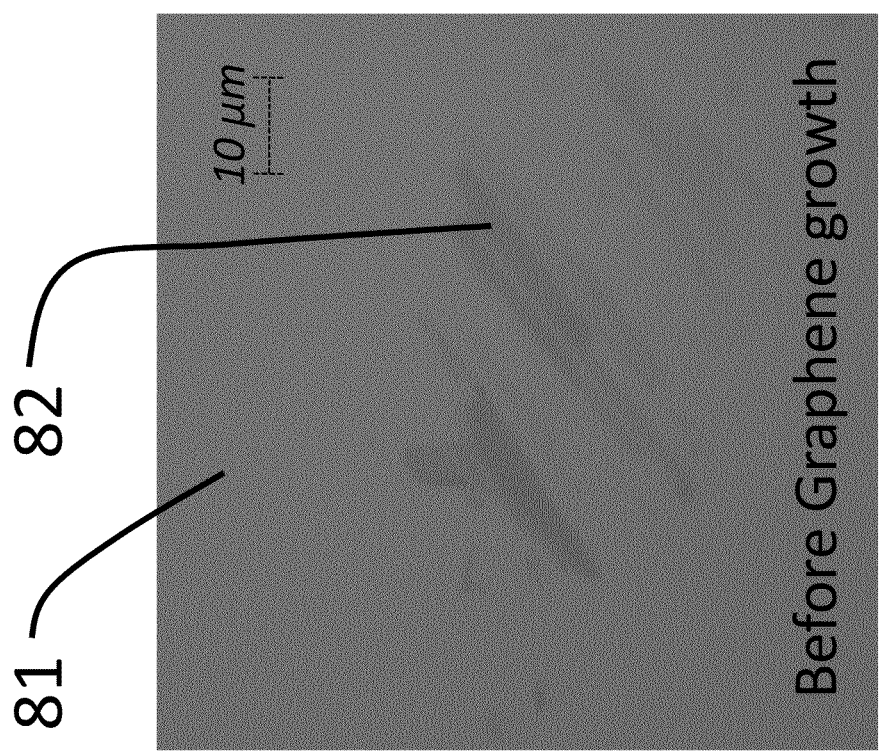
FIG. 8A shows a 300 nm thick silicon dioxide substrate with a seed layer of Graphene exfoliated on it, before the CVD process occurs.

In an initial experiment, Graphene seed layers 81 were exfoliated onto a 300 nm thick silicon oxide substrate 82 as shown in FIG. 8A. Then a layer of 100 nm thick Copper was deposited onto the substrate using an E-beam evaporator. The substrate 82 was then placed in a CVD furnace (a quartz tubular furnace) under a vacuum of 600 mTorr for 10 minutes, then heated to 1000° C. with flow of Hydrogen and Argon at 15 Torr Pressure over the sample. The sample remained at 1000° C. with flow of Hydrogen and Argon for 30 minutes to allow annealing of the Copper layer to remove native oxide. Then methane gas was introduced into the furnace for 5 minutes. The methane molecules dissociated on the Copper surface at this high temperature and some portion of the Carbon atoms diffused through the Copper grain boundaries due to their low solubility in Copper. This resulted in formation of Graphene layers on top of the Copper and at the Copper-substrate interface. The furnace was then cooled down rapidly, with a cooling rate of approximately 10° C. per second. The Hydrogen and Argon flow was turned off at a temperature below 60° C. The sample was removed from the CVD furnace when it reached room temperature and placed into standard Copper etchant solution '49-1' (Transene Company, Inc.) at 30° C. After 6 hours, the sample was removed from the Copper etchant solution and placed in Deionized water. Then the sample was dried using room-temperature airflow.

Figure 8B:
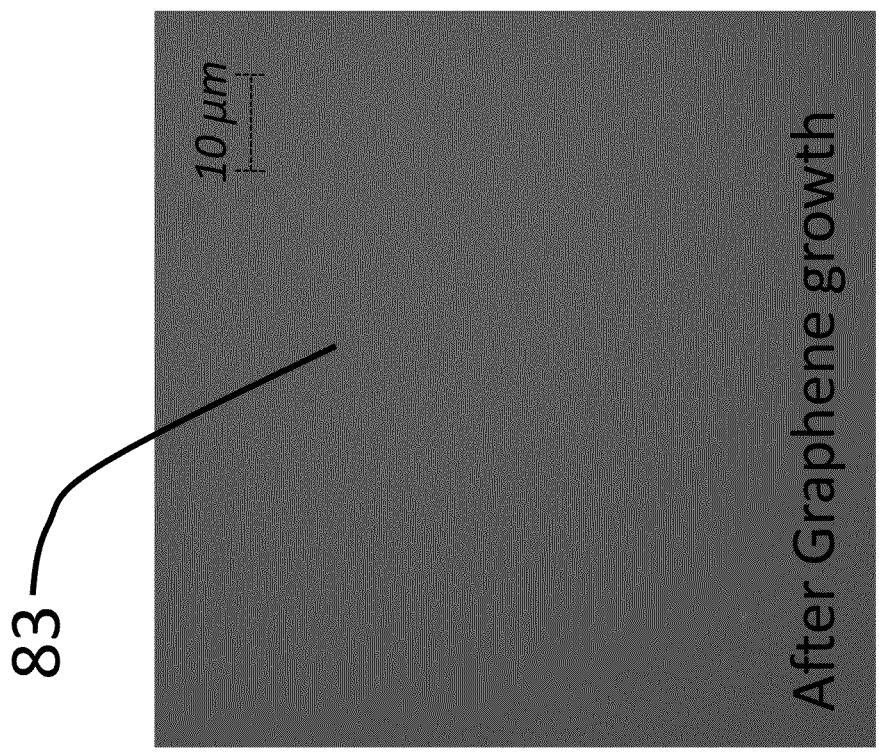
FIG. 8B shows a 300 nm thick silicon dioxide substrate with a uniform layer of Graphene grown over a large area of the substrate (described in FIG. 8A during an experiment) after the CVD process occurs.
Figure 9:
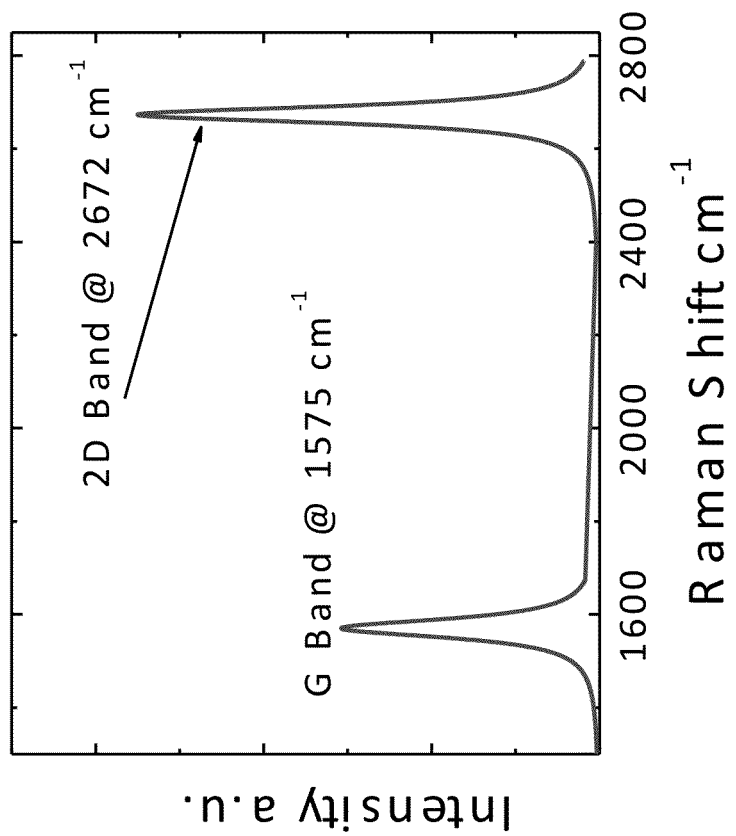
FIG. 9 is the Raman spectrum of the resulting Graphene product shown in FIG. 8B.

The resulting Graphene product was inspected under a microscope. A uniform layer of Graphene product 83 was observed, as shown in FIG. 8B. Raman spectroscopy was then performed on the Graphene product 83 using a 532 nm wavelength laser. As seen in FIG. 9, the Raman spectrum signal of the Graphene product 83 shows the presence of a G peak at approximately 1575 $cm^{-1}$ and a 2D peak at approximately 2672 $cm^{-1}$, which is a well-known signature peak profile for Graphene.

The growth mechanism of Graphene—using the CVD process on various catalyst metals—is well studied. Many publications, including those listed below (and incorporated by reference into this specification) describe various growth mechanisms of Graphene on Copper and other metals. E.g., Li, et al., "Large-Area Synthesis of High-Quality and Uniform Graphene Films on Copper Foils," Science, vol. 324, pp. 1312-1314, 2009; A. Ismach, et al., "Direct Chemical Vapor Deposition of Graphene on Dielectric Surfaces," Nano Letters, vol. 10, pp. 1542-1548, 2010; I. Vlassiouk, et al., "Role of Hydrogen in Chemical Vapor Deposition Growth of Large Single-Crystal Graphene," ACS Nano, vol. 5, pp. 6069-6076, Jul. 26, 2011; W. Zhang, et al., "First-Principles Thermodynamics of Graphene Growth on Cu Surfaces," The Journal of Physical Chemistry C, vol. 115, pp. 17782-17787, 2011; and L. Gao, et al., "Epitaxial Graphene on Cu(111)," Nano Letters, vol. 10, pp. 3512-3516, 2010.

More particularly, Suh et al. describe direct growth of Graphene on the substrate using Copper film deposited on the substrate. C. Y. Su, et al., "Direct Formation of Wafer Scale Graphene Thin Layers on Insulating Substrates by Chemical Vapor Deposition," Nano Letters, vol. 11, pp. 3612-3616, 2011. Some publications describe various ways to grow Graphene using other catalyst metals such as Nickel and Cobalt and using various Carbon absorption processes, including the CVD process and the epitaxial growth process. See, e.g., J. Gao, et al., "Graphene Nucleation on Transition Metal Surface: Structure Transformation and Role of the Metal Step Edge," Journal of the American Chemical Society, vol. 133, pp. 5009-5015, 2011; A. Reina, et al., "Large Area, Few-Layer Graphene Films on Arbitrary Substrates by Chemical Vapor Deposition," Nano Letters, vol. 9, pp. 30-35, 2008; H. Ago, et al., "Epitaxial Chemical Vapor Deposition Growth of Single-Layer Graphene over Cobalt Film Crystallized on Sapphire," ACS Nano, vol. 4, pp. 7407-7414, 2010.

Indeed, the methods of the invention—using a seed layer of Graphene to start growth of a larger Graphene product—may be combined with many processes described in prior publications and with many variations on the reported process conditions. One recent publication by Teng et al. describes a method of growing Graphene directly onto the substrate but in the presence of a catalyst metal that is separate from the substrate. P. Y. Teng, et al., "Remote Catalyzation for Direct Formation of Graphene Layers on Oxides," Nano Letters, vol. 12, pp. 1379-1384, 2012.

Example 2

Figure 10:
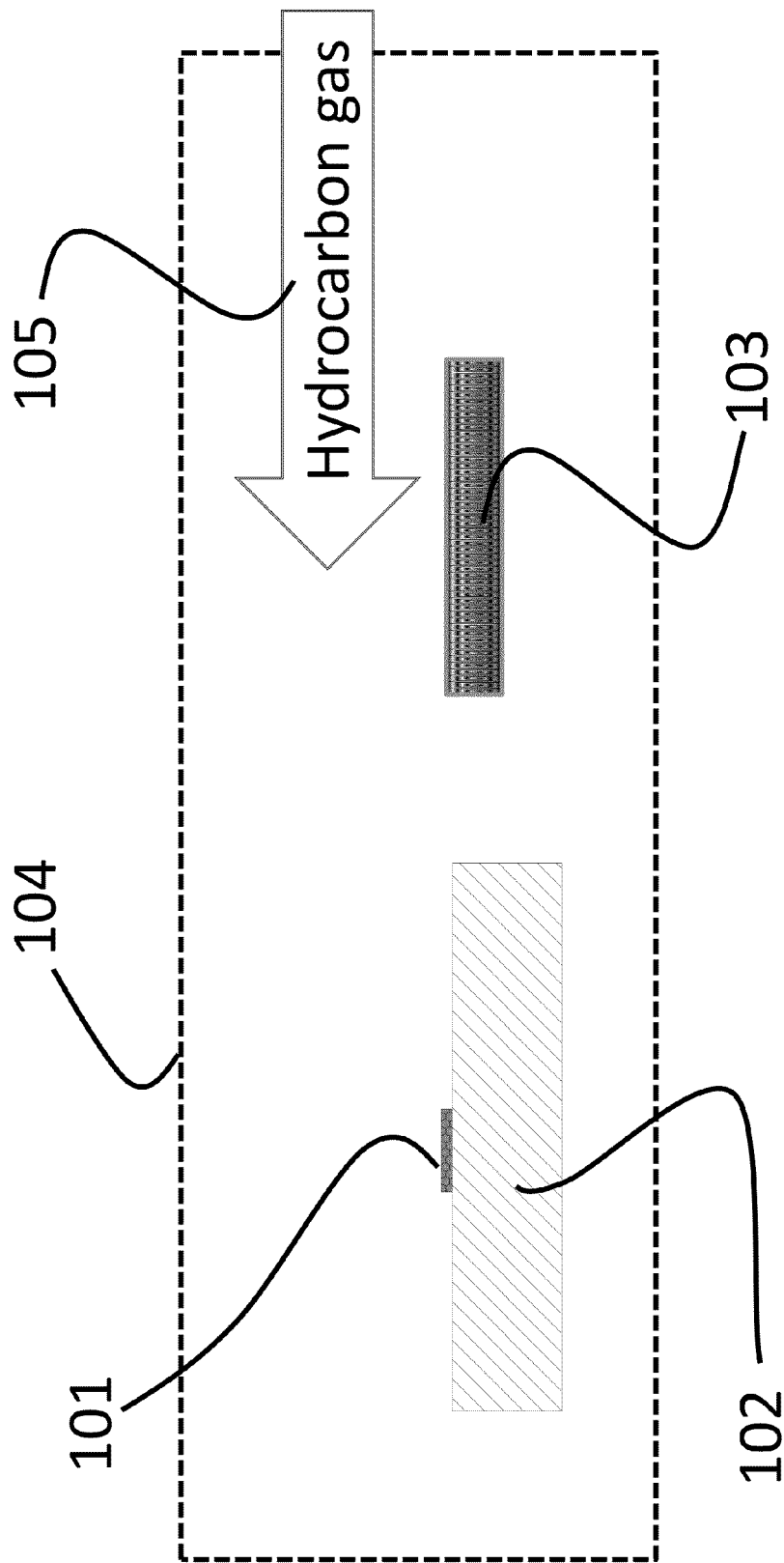
FIG. 10 illustrates the cross-sectional view of a substrate with an exfoliated Graphene seed layer, which are both placed next to a catalyst metal layer inside a CVD furnace.

In another embodiment of the present invention, a seed layer of Graphene may be used to grow high-quality Graphene over a large area using the process involving a physically separated catalyst metal layer, as described in the Teng publication. With reference to FIG. 10, substrate 102 with an exfoliated Graphene seed layer 101 may be placed next to a catalyst metal layer 103 inside a CVD furnace 104. The furnace may be then heated to a high temperature, for example 1000° C., while gases such as Hydrogen and Argon are flowing though the furnace. At such high temperatures, a suitable hydrocarbon gas 105 may be run through the furnace for approximately 5 minutes, followed by rapid cooling of the furnace. At high temperatures, the hydrocarbon gas 105 may decompose at the surface of the catalyst metal layer 103. Some of the Carbon atoms of the decomposed hydrocarbon gas 105 may be deposited on the catalyst metal layer 103. Other Carbon atoms from the decomposed hydrocarbon gas 105 may reach the substrate 102 and are deposited around the Graphene seed layer 101. During the rapid cooling process, the Carbon atoms deposited around the seed layer 101 may be crystallized and become linked to the seed layer 101, resulting in growth of the seed layer 101 and development of high-quality Graphene over a large area of the substrate 102. One skilled in the art will recognize that many variations can be made in these fabrication conditions and parameters to fabricate large-area Graphene using a seed layer of exfoliated Graphene.

It will be understood that the embodiments described herein are exemplary and a person skilled in the art may make numerous variations and modifications suggested by the literature or their experience in the industry without departing from the spirit and scope of the present invention. Such variations and modifications are intended to be included within the scope of the present inventions as described in the written description, including the figures, and the claims, and the references incorporated into this specification.

The invention claimed is:

1. A method of fabricating Graphene, the method comprising:
   providing a base layer comprising a substrate;
   depositing a Graphene seed layer on said substrate prior to introduction of Carbon atoms;
   depositing a catalyst metal layer on said substrate and said Graphene seed layer; and
   introducing Carbon atoms to said Graphene seed layer.

2. The method according to claim 1, wherein said substrate is approximately 90 nm-320 nm thick.

3. The method according to claim 1, wherein said substrate comprises at least one of silicon dioxide, SiC, $Si_3N_4$, quartz, silicon, sapphire, and ST-cut quartz.

4. The method according to claim 1, wherein said substrate comprises silicon dioxide.

5. The method according to claim 1, wherein said Graphene seed layer deposition is performed using mechanical exfoliation.

6. The method according to claim 1, wherein said Graphene seed layer comprises one or more layers of Graphene.

7. The method according to claim 1, wherein said catalyst metal layer is selected from the group consisting of Copper, Nickel, Cobalt, Rhodium, Ruthenium, and Platinum.

8. The method according to claim 1, wherein said catalyst metal layer comprises Cop-per.

9. The method according to claim 1, wherein said catalyst metal layer is approximately 100 nm-800 nm thick.

10. The method according to claim 1, wherein said Carbon atoms are introduced though a chemical vapor deposition process.

11. The method according to claim 1, wherein a source of said Carbon atoms is a hydrocarbon gas.

12. The method according to claim 1, wherein a source of said Carbon atoms is a methane gas.

13. The method according to claim 1, wherein said Carbon atoms are introduced though a solid Carbon source.

14. The method according to claim 13, wherein said solid Carbon source is poly(methyl methacrylate).

15. The method according to claim 1, further comprising the step of etching the top surface of said catalyst metal layer after introduction of said Carbon atoms.

16. The method according to claim 15, further comprising the step of etching away said catalyst metal layer after etching the top surface of said catalyst metal layer.

17. A method of fabricating Graphene, the method comprising:
   providing a base layer comprising a substrate;
   depositing a Graphene seed layer on said substrate prior to introduction of carbon atoms;
   providing a catalyst metal layer that is separate from said substrate and said Graphene seed layer; and
   introducing Carbon atoms to said Graphene seed layer.

18. A method of fabricating Graphene, the method comprising:
   providing a base layer comprising a substrate;
   depositing a Graphene seed layer on said substrate, wherein said Graphene seed layer deposition is performed using mechanical exfoliation;
   depositing a catalyst metal layer on said substrate and said Graphene seed layer; and
   introducing Carbon atoms to said Graphene seed layer.

19. A method of fabricating Graphene, the method comprising:
   providing a base layer comprising a substrate;
   depositing a Graphene seed layer on said substrate;
   depositing a catalyst metal layer on said substrate and said Graphene seed layer; and
   introducing Carbon atoms to said Graphene seed layer, wherein said Carbon atoms are introduced through a solid Carbon source.

20. The method according to claim 19, wherein said solid Carbon source is poly(methyl methacrylate).

* * * * *